United States Patent Office
3,230,899
Patented Jan. 25, 1966

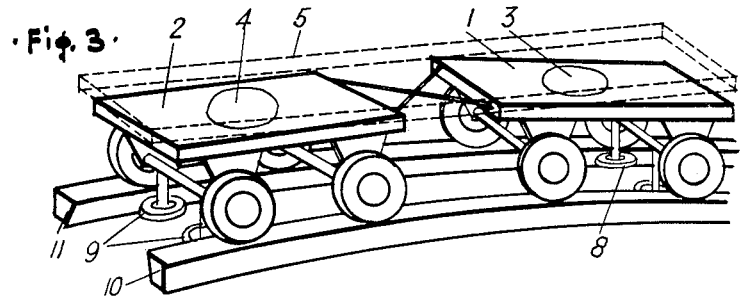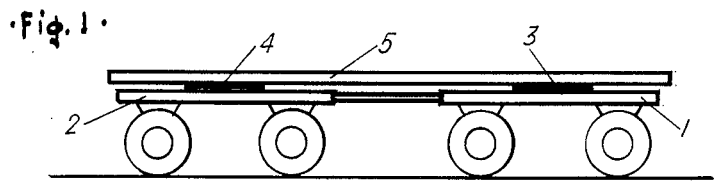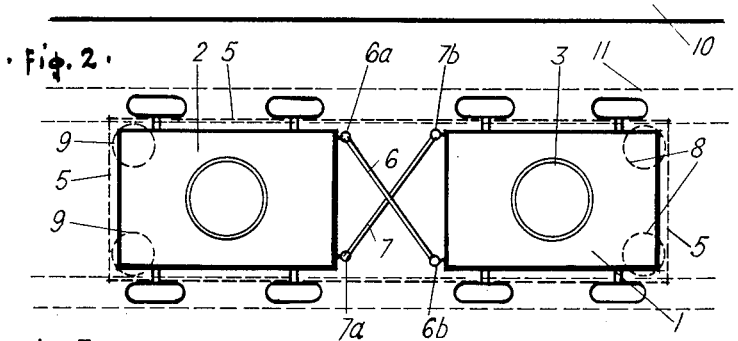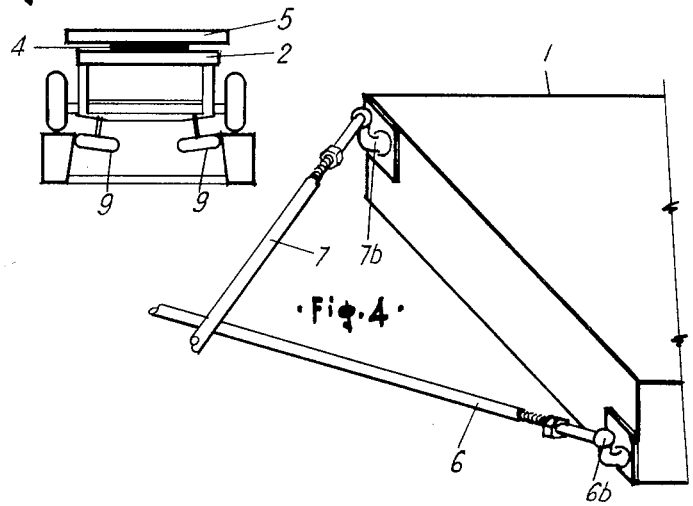

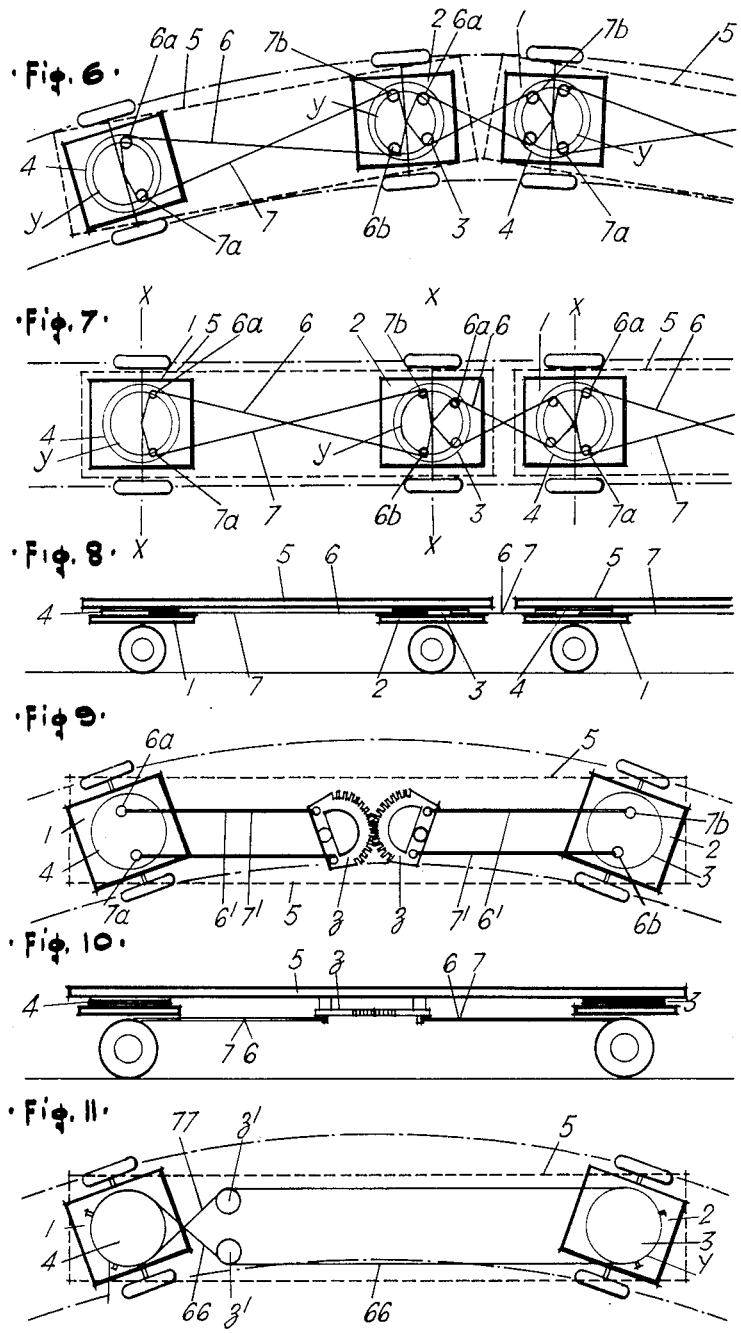

3,230,899
WHEELED VEHICLES AND BOGIES THEREFOR
Thomas Alfred Johnson, Johannesburg, Transvaal, Republic of South Africa, assignor to Pneuways Development Company (Private) Limited, Salisbury, Southern Rhodesia
Filed May 22, 1964, Ser. No. 369,469
Claims priority, application Rhodesia and Nyasaland, June 6, 1963, 319/63; Southern Rhodesia, May 5, 1964, 172/64
4 Claims. (Cl. 105—4)

This invention relates to wheeled vehicle bogies which are provided for the support and steering of vehicles on roads or rail tracks and are rotatably connected to the vehicle bodies or chasses and each bogie has one or more pairs of load-carrying wheels, commonly two pairs arranged on fixed parallel axes. It provides means for the interconnection of a pair of such bogies, arranged in tandem for the support either of a common vehicle body or separate vehicle bodies as a train, in such a way that when the vehicle or vehicles is/are in motion, wheels of one bogie follow substantially exactly in the tracks of the corresponding wheels of the bogie in front of it, thus not only facilitating steering but also greatly reducing wear and stresses on the tires and the wheels generally. The said means of interconnection may be applied also to the articulative coupling of the bodies of a pair of vehicles in train arrangements, irrespective of the nature or arrangement of the load carrying wheels of the respective vehicles and with or without inter-vehicle buffing means.

In either of its such uses the aforesaid interconnection is applicable with not only such above effects and advantages to, but for substantially increasing the safety factor in, rail transport systems generally, and specifically of the kind in which, for the guidance of the load-carrying wheels of a vehicle on parallel spaced running tracks or rails, reliance has alone been placed upon guide wheels and/or jets of compressed air arranged to run against or coact with outside or inside lateral surfaces of rail or beam members which present the said running tracks, as for instance only, in the case of the systems the subject inter alia of our Patents Nos. 3,119,349 and 3,126,839, and patent applications Nos. 127,452 and 127,463.

According to this invention wheeled vehicle rotatable or free-swinging bogies, or wheeled vehicles, which are or can be tractively and articulatively coupled in tandem arrangement, are so coupled by a mechanical linkage or other means adapted to impart to either one of an adjacent pair of such coupled bogies, or vehicles, reciprocal or opposite steering movements to those applied to the other.

This invention also consists in an articulative coupling between an adjacent pair of rotatable or free-swinging wheeled bogies in tandem arrangement, which pair of bogies either support a single vehicle or support or contribute to the support of two vehicles in train arrangement, said coupling comprising a tension- and/or compression-sustaining link disposed substantially horizontally between the said pair of bogies and pivotally connected at its opposite ends respectively to two corresponding but diagonally opposed points presented by the respective bogies.

More particularly the said points presented by adjacent bogies and between which such link is arranged are equally offset generally towards one another from the respective two transverse planes containing the respective bogie pivotal axes and parallel to the respective bogie wheel axles, the extent of such offset being such that when said two (transverse) planes are parallel to one another the direction of the link is tangential to two equal circles centred respectively in the respective bogie pivotal axes, such offset accordingly being an inverse function of the distance between said bogie pivotal axes.

Preferably, however, and essentially in cases where the leading end of the following or trailing one of two thus-coupled bogies (or vehicles) in motion is not constrained by means extraneous to the coupling against outward tangential movements when tranversing curves, two such links each arranged as aforesaid are provided in crossing arrangement. Thus, in such cases, the interlinking points of an adjacent tandem pair of pivotal bogies, whether of the same or of adjacent vehicles in a train, are interconnected by an articulative linkage comprising a pair of relatively moveable links of equal length disposed substantially horizontally in crossing arrangement and each connected pivotally at its opposite ends respectively to a diagonally related pair of four points occurring as the corners of a geometric quadrangle in equispaced pairs symmetrically disposed about the respective axes of travel of the bogies, and offset in the senses and to the extent aforementioned from the aforesaid respective transverse planes of the bogies.

The invention is not limited to the coupling of adjacent bogies through single or twin-crossing links, because the like reciprocal steering effects may be obtained by various other devices operative on like geometric or analogous principles.

In the accompanying drawings, which are semi-diagrammatic as suffices to illustrate the principles and operation of this invention, by way of example:

FIGURES 1 and 2 are respectively an elevation and a plan of a pair of bogies together supporting a single vehicle or chassis;

FIGURE 3 is a corresponding perspective view with the vehicle following a curved path;

FIGURE 4 is a fragmentary view showing connections of coupling links to a bogie (or vehicle) end;

FIGURE 5 is an end view corresponding to FIGURES 1 and 2;

FIGURES 6 and 7 are plan views showing on curved and straight tracks respectively reciprocal steering linkages or couplings between two bogies of one vehicle, and one of such bogies and the adjacent bogie of an adjoining vehicle;

FIGURE 8 is a side elevation corresponding to FIGURE 7;

FIGURES 9 and 10 are plan and side elevation views, like FIGURES 6 and 8, of an alternative linkage or coupling between two adjacent bogies of one vehicle; and FIGURE 11 is a plan view, FIGURE 9, of a further alternative inter-bogie linkage.

In FIGURES 1 to 5, reference numerals 1 and 2 respectively denote two identically constructed bogies of relatively short based, two-axle, four-wheel type connected through turntables 3 and 4 to a common vehicle chassis or body denoted by reference 5.

The two bogies are articulated, in terms of earlier statements herein, through the two equal links 6 and 7 whereof the opposite ends are connected in ball and socket or other suitable universal joints, as at 6a, 6b and 7a, 7b in the drawings, to the proximated ends of the bogies, the links crossing one another without interference to their relative movements which occur in the steering conditions of the bogies such as that illustrated in FIGURE 3.

Referring particularly to FIGURE 3, the reciprocal or equal opposite steering movements of the two bogies generated through the links 6 and 7 are well illustrated in relation to the tangential position (shown in broken lines) of the common chassis 5 with respect to the curved path of movement of the vehicle in either direction. With the common chassis assumed to be removed, so that the two bogies are then connected tractively through the links alone, the bogies may then be treated as independent wheeled vehicles, e.g., a steerable tractor with a trailer hauled thereby.

The reciprocal steering movements of the bogies or separate vehicles brought about by the articulative linkage described are obtained irrespective of the track surface on which the system runs, i.e. whether on an ordinary road surface or on spaced rails or the like, and whether steering of the leading bogie or vehicle is applied by internal mechanism (as in the case of ordinary road vehicles) or by coaction of guide wheels, as for instance wheels 8, 8 and 9, 9 associated with the bogie or vehicle load-carrying wheels, with side surfaces of rails as 10, 11 in FIGURES 1, 2, 3 and 5.

Referring now to FIGURES 6, 7, and 8 in which parts corresponding to those appearing in the earlier figures bear like reference numerals, it will be seen that the inter-bogie coupling links 6 and 7, in the crossing arrangement, extend when the transverse bogie axes $x, x$ are parallel as in FIGURE 7, between the pivotal connection points $6a$, $6b$, $7a$, $7b$ in directions tangential to the respective circles $y, y$ on which said points occur. Of these points (which form the corners of the quadrangle already referred to) $6a$ is offset towards $7b$ and vice versa and $6b$ is offset towards $7a$ and vice versa and this to an extent which is the aforementioned inverse function of the distance between the bogie pivotal axes, and thus generally either such inverse function of the length of a two-bogie vehicle or of the distance between adjacent bogies of leading and following vehicles.

In illustration of means of carrying the invention into effect, for instance without diagonal or crossing links, reference is made to FIGURES 9, 10 and 11.

Thus, for example, as shown in FIGURES 9 and 10, corresponding reciprocal turning movements between adjacent bogies may be obtained mechanically through co-operating quadrants or racks $z, z$ located between the bogies and caused respectively and through parallel operating links $6'$, $7'$ of appropriate length to partake of turning movements of either one of the bogies and transmit them in reverse sense to the other bogie.

Alternatively, as shown in FIGURE 11, flexible cable or like elements 66 and 77 may be arranged to extend between adjacent bogie turntables, subject to the arrangement of the cables or the like being such that the effective points of attachment thereof between the bogies in their angular movements are similarly related to one another and to the aforementioned transverse planes and circles of the bogies as are the said points of link—connection in the foregoing examples. In the illustrated example the cables pass round reversing pulleys $z'$, $z'$ after crossing from tangential dispositions in relation to the identical circles $y, y$ presented by the turntable peripheries.

The like reciprocal steering effects as between bogies may alternatively be brought about by means other than such as are described above, i.e. other than purely mechanical linkage articulation, e.g. by using hydraulic fluid transmission of compressive and/or tensile forces between the correctly selected points of the respective adjacent bogies.

The reciprocal steering movements of the bogies or separate vehicles brought about by such various means as those described are independent of the track surface on which the system runs, i.e., whether on an ordinary road surface or on spaced rails or the like, and whether steering of the leading bogie or vehicle is applied by internal mechanism (as in the case of ordinary road vehicles) or by coaction of guide wheels, associated with bogie or vehicle load-carrying wheels, with side surfaces of track rails.

Inter-bogie or inter-vehicle articulative couplings or devices providing for reciprocal steering the subject of this invention, when included in railed transport systems such, for instance, as those already referred to, add considerably to the safety factor of such systems, insofar as reliance is then no longer placed wholly as in the past upon effective operation of wheel flanges, guide wheels and/or compressed air jets to constrain the vehicles laterally on relatively narrow track surfaces.

I claim:

1. Means for mechanically coupling bogies of vehicles comprising a plurality of bogies rotatable about their respective pivotal axes, having pairs of load-carrying wheels, two links disposed substantially horizontally between two adjacent bogies to couple said adjacent bogies, each link being pivotally connected at its opposite ends respectively to two corresponding but diagonally opposed attachment points on said adjacent bogies, said attachment points being so located with respect to the pivotal axes of said bogies that each link is tangent to two equal circles drawn through said attachment points on, and about the pivotal axes of, each of said adjacent bogies when such adjacent bogies are in line with each other with the planes of rotation of their load carrying wheels parallel to each other.

2. Coupling means according to claim 1 wherein each link is rigid and of constant length.

3. Coupling means according to claim 1 wherein each bogie carries two pairs of load carrying wheels arranged on fixed parallel axes.

4. Coupling means according to claim 1 wherein said adjacent bogies are mounted on two adjoining vehicles which are coupled to each other.

References Cited by the Examiner

UNITED STATES PATENTS

| | | | |
|---|---|---|---|
| 2,908,233 | 10/1959 | Furrer | 105—453 |
| 2,921,539 | 1/1960 | Furrer | 105—4 |
| 2,936,720 | 5/1960 | Van Alstine | 105—4 |
| 2,956,515 | 10/1960 | Lich | 105—4 |

FOREIGN PATENTS 303,796  10/1929  Switzerland.

ARTHUR L. LA POINT, *Primary Examiner.*

MILTON BUCHLER, *Examiner.*

B. FAUST, *Assistant Examiner.*